United States Patent
Mang et al.

(10) Patent No.: US 6,532,918 B1
(45) Date of Patent: Mar. 18, 2003

(54) METHOD AND DEVICE FOR LUBRICATING AND SIMULTANEOUSLY SUPPLYING FUEL IN A VEGETABLE OIL-OPERATED COMBUSTION ENGINE

(75) Inventors: Theo Mang, Weinheim (DE); Rolf Luther, Speyer (DE)

(73) Assignee: Fuchs Petrolub AG, Mannheim (DE)

( * ) Notice: Subject to any disclaimer, the term of this patent is extended or adjusted under 35 U.S.C. 154(b) by 0 days.

(21) Appl. No.: 09/530,272
(22) PCT Filed: Oct. 27, 1998
(86) PCT No.: PCT/EP98/06805
  § 371 (c)(1),
  (2), (4) Date: Jun. 23, 2000
(87) PCT Pub. No.: WO99/23364
  PCT Pub. Date: May 14, 1999

(30) Foreign Application Priority Data

Oct. 30, 1997 (DE) .......................... 197 47 854

(51) Int. Cl.$^7$ ............................................. F02M 31/16
(52) U.S. Cl. .................................. 123/73 AD; 123/1 A
(58) Field of Search ............................ 123/73 AD, 1 A

(56) References Cited

U.S. PATENT DOCUMENTS

| | | | | |
|---|---|---|---|---|
| 4,297,109 A | * | 10/1981 | Sugito et al. | 44/56 |
| 4,359,324 A | * | 11/1982 | Elsea, Jr. et al. | 44/57 |
| 4,526,586 A | * | 7/1985 | Schwab et al. | 44/57 |
| 4,557,734 A | * | 12/1985 | Schwab et al. | 44/57 |
| 5,575,354 A | * | 11/1996 | Taylor | 123/73 AD |
| 5,630,383 A | * | 5/1997 | Kidera et al. | 123/73 AD |
| 5,662,090 A | * | 9/1997 | Ward | 123/557 |
| 5,676,106 A | * | 10/1997 | Hoffman, II et al. | 123/73 AD |

FOREIGN PATENT DOCUMENTS

| | | |
|---|---|---|
| EP | 0 578 495 | 1/1994 |
| EP | 0 604 125 | 6/1994 |
| EP | 43 25 194 | 2/1995 |
| FR | 2 733 994 | 11/1996 |
| WO | 93/06198 | 4/1993 |

* cited by examiner

Primary Examiner—Noah P. Kamen
Assistant Examiner—Jason Benton
(74) Attorney, Agent, or Firm—Wenderoth, Lind & Ponack, L.L.P.

(57) ABSTRACT

A method and a device for the lubrication and for the simultaneous fuel supply of a vegetable oil-rated internal combustion engine is described in which the internal combustion engine is operated exclusively with vegetable oil thereby that during operation an additive-treated vegetable oil is continuously supplied as lubricant and the used vegetable oil lubricant is combusted in doses as engine fuel together with fresh vegetable oil fuel in the engine.

14 Claims, 2 Drawing Sheets

METHOD AND DEVICE FOR LUBRICATING AND SIMULTANEOUSLY SUPPLYING FUEL IN A VEGETABLE OIL-OPERATED COMBUSTION ENGINE

Subject matter of the invention is a method for lubrication and simultaneous fuel supply of an internal combustion engine in which the combustion engine is operated exclusively with vegetable oil.

For lubrication and for fuel supply of internal combustion engines which operate with spark ignition or with compression ignition, currently predominantly petroleum oils are still used. However, partially or fully synthetic lubricants are also already in use which, through the addition of additives, acquire the requisite complex properties desired for technical applications. It is known that the lubrication oil must be changed at specific time intervals since during operation active substances re consumed, the basic material ages and the lubricant is contaminated with foreign substances. During the oil change, old oils accumulate which represent a considerable environmental problem. They must be disposed of in complicated and expensive ways. In order to avoid the accumulation of old oil, it has already been proposed to recirculate the consumed lubrication oil into the fuel tank and to combust it in the engine together with the fuel.

DE 31 38 144 A1 discloses a lubricant and fuel cyclic course in particular for the Diesel engines of heavy duty trucks in which periodically a given quantity of lubrication oil is extracted from the oil pan of the engine and placed into the fuel tank such that the extracted quantity is consumed together with the customary Diesel fuel. In addition, an automatically operating configuration for monitoring the level of the lubrication oil is provided in order to maintain the lubrication oil level in the oil pan at a nominal level such that fresh lubrication oil is continuously introduced into the lubricant cyclic course and simultaneously a periodic purification of the used oil occurs. Hereby the waiting times are intended to be decreased which are required for an oil change and the lubrication oil is, nevertheless, substantially kept clean and in fresh condition. By adding continuously fresh lubrication oil, the fraction of additives in the lubrication oil is to be kept at the desired value. Thus, only an oil change which customarily takes place at intervals, is avoided thereby that continuously a specific quantity of exhausted oil is withdrawn from the lubrication system and a corresponding quantity of fresh oil is introduced into the lubrication system.

From DE-OS 30 19 877 a device for changing oil in a fuel-burning engine with internal combustion with a lubrication system with oil pan and a fuel system with fuel tank is known in which, for the self-acting oil change and carrying off the exhausted oil, oil transport means for transferring a portion of the exhausted engine oil from the lubrication system to the fuel system in order to mix the exhausted oil fraction with the fuel, in which an oil tank for storing fresh oil is provided and in which oil feeding means for supplying fresh oil from the oil tank to the lubrication system are provided. The oil transport means can comprise an oil line whose one end communicates with the lubrication system and whose other end with the fuel system, as well as a valve in the oil line. The oil feeding means can further comprise an oil feed line, whose one end is connected with the oil tank and whose other end with the oil pan, and a valve interconnected in the oil feed line. This is intended to solve the task of providing a method and a device for changing oil in a fuel-burning engine in which exhausted oil does not need to be processed again and oil is changed and exhasuted oil are automatically carried off.

DE 30 06 903 A1 discloses a method for the replacing of the lubrication oil collected in the oil sump of a fuel-burning engine with the aid of an oil suction pump to be controlled separately, wherein at least the quantity of fresh oil corresponding to the quantity of oil siphoned off is supplied to the fuel-burning engine, in which the oil suction pump mixes dosed quantities of oil from the oil sump of the fuel-burning engine to the fuel of the fuel-burning engine, wherein the quantities of oil are dimensioned such that—independently of the oil consumption of the fuel-burning engine—within an oil change interval the prescribed oil filling quantity is siphoned off. Further, a device is proposed for carrying out this method comprising a fuel-burning engine with an oil sump in which a constant tankage of lubrication oil is provided, and with a separate oil suction pump connected with the oil sump of the fuel-burning engine on its suction side, in which quantities of oil dosed by the oil suction pump can be removed from the oil sump of the fuel-burning engine and be supplied to the fuel of the fuel-burning engine. Hereby necessary oil changes are said to be superfluous. The level (height) of the lubrication oil quantity is dimensioned such that the oil filling quantity is siphoned off independently of the oil consumption of the fuel-burning engine within the oil change intervals specified by the engine manufacturer for the engine type. The control instrument is laid out such that only in the case of a fuel filling process in which the level indicator moves upwardly within a short time, the oil suction pump starts to operate. Therewith simultaneously lubrication oil and fuel are filled into the fuel tankage container such that good thorough mixing is ensured.

In all engine lubrications provided so far it is of disadvantage that due to the use of conventionally additive-treated petroleum oils, the environment is harmed in unsatisfactory manner and no measures are provided for adding exhausted oil to the fuel system in dosed quantities.

A method and a device for lubricating an internal combustion engine is also known from the German Patent 39 06 759, in which to the lubrication content of the itnernal combustion engine during operation repeatedly always fresh lubricant is supplied from a fresh oil tank and simultaneously to the lubricant content of the combustion engine repeatedly at least partially aged lubricant is withdrawn and mixed in doses to the engine fuel for combustion. As lubricant is therein essentially used natural vegetable oil, for example rape seed oil. The at least partially aged oil drawn off via a dosing pump, is subsequently supplied under control to the fuel tank of the combustion engine according to the level of the engine fuel such that a predetermined concentration of the vegetable oil is not exceeded.

In this type of loss lubrication of an internal combustion engine the finding is utilized that to the fuel of an internal combustion engine with spark ignition or compression ignition oil up to a few percent can be added without impairing the engine performance, which oil subsequently is combusted during the fuel combustion. Thereby that, on the one hand, to the internal combustion engine during its operation repeatedly fresh oil is continuously supplied according to the invention, but, on the other hand, the partially aged oil is also repeatedly from the internal combustion engine withdrawn, in this loss lubrication continuously a sufficient tankage of fresh lubrication oil is available for the lubrication. Since herein natural vegetable oil is used, the exhausted oil which is only supplied to the fuel in limited and precisely controlled quantity and is combusted with it, also does not result in any combustion products which might be harmful to the environment. Prerequisites for the joint combustion of the exhausted vegetable oil are control and regulation instruments which control precisely the quantities of vegetable oil drawn out of the oil pan and supplied to the fuel. However, with this method it is not possible to operate an internal combustion engine exclusively with vegetable oils.

There have also been considerations given to employing vegetable oils as fuel in Diesel engines. While for this purpose initially the methyl esters of natural oils, for example the rape seed methyl ester, have been in the forefront of interest, since, for their use, the conventional Diesel engines only need to be modified insignificantly, attention subsequently was concentrated on the chemically unaltered natural vegetable oils which as renewable raw materials compatible with the environment can be used in particular for utility vehicles in the fields of agriculture and forestry as alternatives to petroleum oil products. Therefore a "Vorläufiger Qualitätsstandard für Rapsöl als Kraftstoff (preliminary quality standard for rape seed oil as fuel)" has already been worked out by the team "Dezentrale Pflanzen ölgewinnung Weihenstephan" (decentral vegetable oil production Weihenstephan).

The present invention is thus based on the concept of using for the lubrication as well as also for the fuel supply of internal combustion engines natural vegetable oils exclusively.

Subject matter of the invention is therefore a method for the lubrication and simultaneous fuel supply of an internal combustion engine in which the internal combustion engine is operated exclusively with vegetable oil, thereby that during the operation continuously an additive-treated vegetable oil is supplied as lubricant and the used vegetable oil-lubricant together with fresh vegetable oil is combusted in doses in the engine as engine fuel.

DETAILED DESCRIPTION OF THE INVENTION

Figure 1:
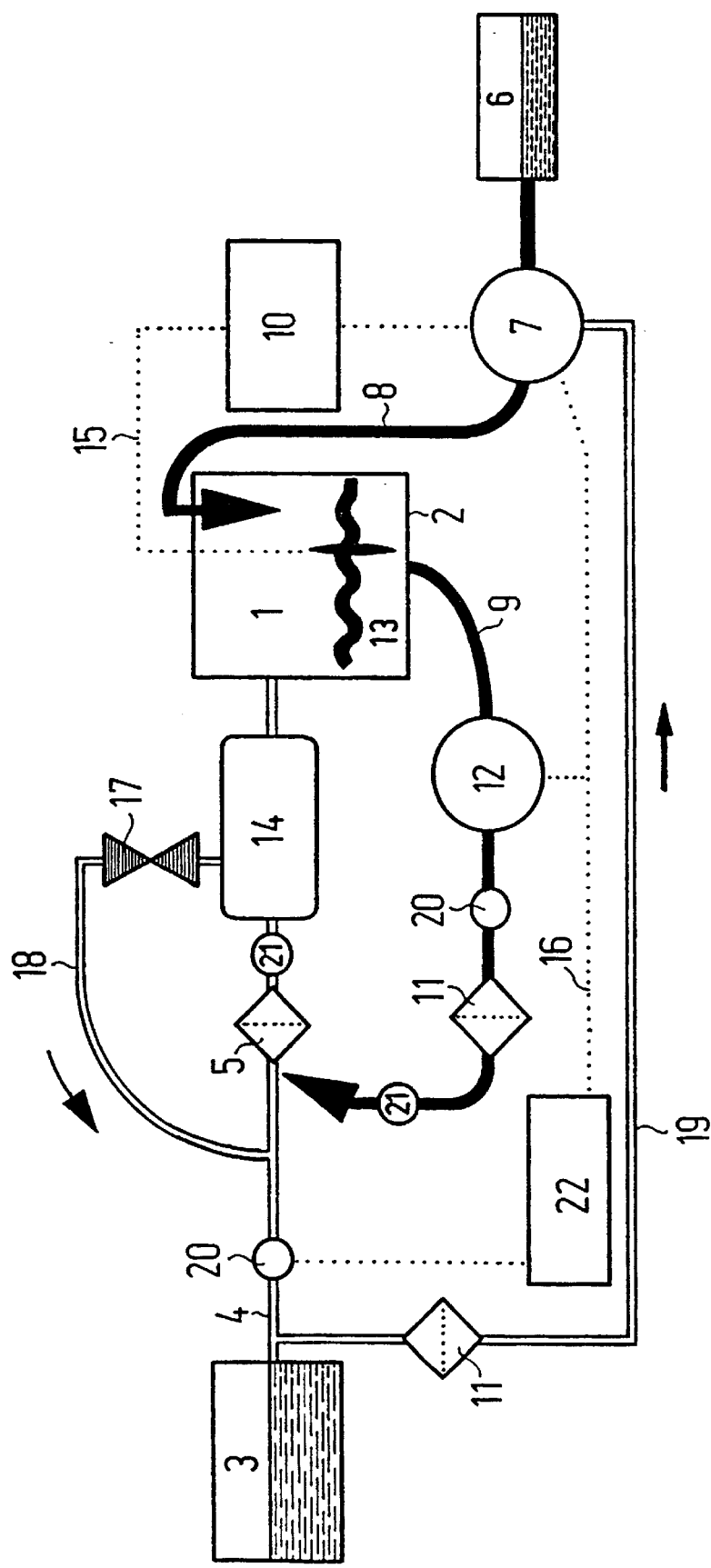
FIG. 1 is a schematic view of the lubrication and fuel supply system of the present invention.
Figure 2:
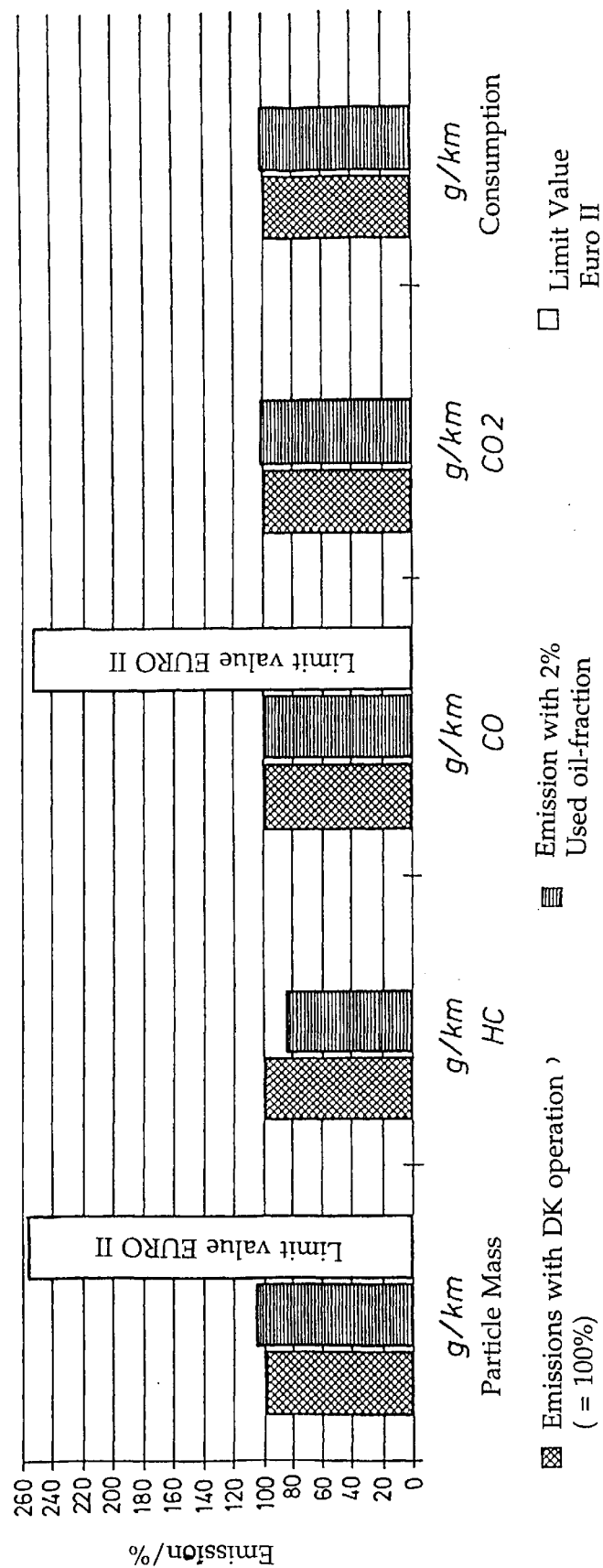
FIG. 2 is a graph showing a comparison of emission percentages for various types of fuel.

An internal combustion engine 1 suitable for operation with vegetable oil fuel, for example a modified Diesel engine, is supplied via a fuel line 19 by means of a fresh oil-dosing pump 7 equipped with a mixing valve with the precise addition in doses of an additive concentrate from a tank 6 via a fresh oil line 8 with the required quantity of a natural vegetable oil, such as rape seed oil, for lubrication. The mixing ratio of additive concentrate:fresh oil can fluctuate between 10:90 and 40:60, however, in general it is about 25:75. In the oil pan 2 of the engine the quantity of the engine oil 13 is kept at a specific level by means of an oil level control 10. The fresh oil pump 7 receives from the oil level control 10 via the oil level meter 15 a start signal if the oil level in the oil pan 2 falls below a predetermined value. When the nominal level of filling is reached, the fresh oil pump 7 is again switched off. In this way the engine oil 13 in the oil pan 2 is always supplemented with fresh oil from the tank 6. Within the oil pan 2 is disposed a—not shown—oil pump which ensures the lubrication of the internal combustion engine 1 with the aid of the engine oil 13. From the bottom region of the oil pan 2 a used oil line 9 branches off through which the used vegetable oil is drawn off by means of the used oil pump 12 and via the fuel filter 11 is supplied to the fuel line 4 before the fuel filter 5 and thus also before the fuel pump 14. The quantity of the used oil flowing through the used oil line 9 can be controlled through the throughflow quantity meter 20 and the temperature sensor 21. It is understood that the used oil line 9 can also terminate in the fuel tank 3.

The used vegetable oil mixed with the fuel drawn from the fuel tank 3 via the fuel line 4 and the throughflow quantity meter 20 is transferred via the fuel filter 5 and the temperature sensor 21 to the fuel pump 14. Because of the fuel return lines present in Diesel engines—the fuel pump delivers considerably more than the engine consumes, so-called dual line system—in order to avoid used oil accumulations in the tank, the return line 18 must be carried back directly into the fuel line 4. The functions of the dual line system—cooling and ventilation of the fuel—can also be assumed by other known ventilation systems, if necessary.

The method according to the invention can be carried out with a modified Diesel engine set up for operation with vegetable oils. As vegetable oils are used rape seed oil, linseed oil, soybean oil, sunflower oil or palm oil, to which for the lubrication function small quantities of highly effective additives comprising antioxidants, wear protection additives, detergents and dispersion agents are added and the ash-forming components of the additives do not comprise any zinc and the sum of them is less than 0.5 percent by weight (oxide ash). The continuous replenishment of the lubricant permits a lower dosage of the particular additives than in conventional circulation lubricants, whereby the effect onto the environment is minimized. Initially a concentrate of the additives in the vegetable oil is preferably produced and this concentrate is subsequently added to the vegetable oil in specific quantities.

The addition of additives to said vegetable oils is important since nonadditive-treated vegetable oil could only lubricate an engine for a short period of time, without causing permanent damage. It is also important that the vegetable oil for the engine lubrication can only be used according to the replenishment method according to the invention since otherwise engine damage would also need to be expected. On the other hand, it must be emphasized that the method according to the invention cannot be operated with a conventional additive-treated petroleum engine oil since this customarily comprises heavy metal-containing additives which are set free during the combustion of the oil and then harm the environment. A further advantage of the method according to the invention comprises that the used lubrication oil containing phenolic and/or aminic additives, after being mixed with the vegetable fuel, also has a stabilizing effect on it.

Subject matter of the invention is also an internal combustion engine with which the method according to the invention can be carried out. This engine, shown schematically in FIG. 1, is in particular characterized by the fresh oil pump 7 equipped with a mixing valve, with which an engine lubricant capable of full function is produced on the basis of vegetable oil. Depending on the layout, from 60 to 90% of fresh vegetable oil and 40 to 10% additive concentrate in engine oil of conventional viscosity classes is produced (for example 5W-30 or 5W-40). This engine oil is pumped into the internal combustion engine. The fresh oil pump 7 is connected through a control line 16 with the used oil pump 12 as well as also with the throughflow quantity meter 20, which ensures that the quantity delivered by the fresh oil pump 7 of fresh vegetable oil is dimensioned such that the oil level in the oil pan always remains at the same level. The quantity of used oil removed through the used oil pump 12 from the oil pan 2 is compensated by fresh oil which is supplied to the engine 1 via the fresh oil line 8. The regulation devices are set by means of the control 22 overall such that the quantity of vegetable oil supplied to the engine is controlled according to the fuel consumption. It was found to be advantageous to set the quantity supplied to the inventional combustion engine of used vegetable oil lubricant to a dosing proportion of 1 to 10%, preferably up to 2% of the fuel consumption. As a function of the additive concentration lower or higher dosing proportions are also possible.

The method according to the invention and the internal combustion engine developed for it can be applied in various ways. It is evident that they are used in particular for utility vehicles in the field of agriculture and forestry since here the vegetable oils required according to the invention are most readily available. A special advantage, however, is also evident in the operation of block heating and power stations for which the oil change automated and continuous according to the invention is of outmost importance. The previously customary oil change intervals after 300 to 500 operating hours considered unavoidable, which, when using rape seed oil methyl ester, are to some extent even considerably shorter, due to the therein entailed operation interruptions, lead to considerable costs. However, if, with application of the method according to the invention, an oil change is no longer required the block heating and power station can run continuously which leads to considerable savings of operating costs and a significant improvement of the economy of such heating and power stations.

LIST OF REFERENCE SYMBOLS

1. Internal combustion engine
2. Oil pan
3. Tank for vegetable oil fuel
4. Fuel line
5. Fuel filter I (fine)
6. Tank for additive concentrate
7. Dosing pump with mixing valve
8. Fresh oil line
9. Used oil line
10. Oil level control
11. Fuel filter II (coarse)
12. Used oil pump
13. Engine oil
14. Fuel pump (injection pump)
15. Oil level meter
16. Pump driving line
17. Overflow valve (fuel pump)
18. Fuel return line
19. Fuel line for lubricant base oil
20. Throughflow quantity meter for fuel
21. Fuel temperature sensor
22. Electronic control

What is claimed is:

1. A method of lubricating and simultaneously fueling a vegetable oil-operated internal combustion engine, comprising:
   storing vegetable oil in a container;
   drawing a portion of the vegetable oil from the container through a first feed line;
   controlling a quantity of the vegetable oil drawn from the container;
   adding additives to the portion of the vegetable oil drawn off from the container so as to form vegetable lubrication oil;
   supplying the vegetable lubrication oil to the internal combustion engine for lubrication;
   drawing exhausted vegetable lubrication oil from an oil pan of the internal combustion engine;
   supplying a remaining portion of the vegetable oil in the container to the internal combustion engine through a second feed line; and
   adding the exhausted vegetable lubrication oil drawn from the oil pan into the vegetable oil being supplied from the container to the internal combustion engine so as to form vegetable fuel oil to be combusted in the internal combustion engine.

2. The method of claim 1, wherein the vegetable oil includes at least one of rape seed oil, linseed oil, soybean oil, sunflower oil, and palm oil.

3. The method of claim 1, wherein said controlling of the quantity of the vegetable oil drawn from the container is based on a quantity of the exhausted vegetable lubrication oil drawn from the oil pan.

4. The method of claim 1, further comprising controlling a quantity of the exhausted vegetable lubrication oil drawn from the oil pan.

5. The method of claim 4, wherein said controlling of the quantity of the exhausted vegetable lubrication oil drawn from the oil pan comprises maintaining the quantity of the drawn exhausted vegetable lubrication oil at 1% to 20% by weight of the vegetable fuel oil to be combusted by the internal combustion engine.

6. The method of claim 5, wherein said controlling of the quantity of the exhausted vegetable lubrication oil drawn from the oil pan comprises maintaining the quantity of the drawn exhausted vegetable lubrication oil at 1% to 2% by weight of the vegetable fuel oil to be combusted by the internal combustion engine.

7. The method of claim 1, wherein the vegetable fuel oil includes the additives added to the portion of the vegetable oil drawn off from the container to form the vegetable lubrication oil.

8. A method of operating one of a block heating station and a power station using the method of claim 1.

9. An apparatus comprising:
   an internal combustion engine;
   a reservoir container for storing vegetable oil;
   a dosing pump having a mixing valve;
   an additives container for storing additives, said additives container being connected to said dosing pump;
   a first feed line for supplying a portion of the vegetable oil from said reservoir container to said dosing pump, said dosing pump being operable to mix the portion of the vegetable oil with the additives from said additives container so as to form a vegetable lubrication oil;
   a delivery line for supplying the vegetable lubrication oil from said dosing pump to said internal combustion engine; and
   a second feed line for supplying a remaining portion of the vegetable oil from said reservoir container to said internal combustion engine.

10. The apparatus of claim 9, wherein said internal combustion engine has an oil pan, further comprising an exhausted vegetable lubrication oil supply line for supplying a portion of exhausted vegetable lubrication oil from said oil pan of said internal combustion engine to said second feed line.

11. The apparatus of claim 10, wherein said exhausted vegetable lubrication oil supply line includes an oil pump and an oil filter.

12. The apparatus of claim 9, further comprising a flow meter and a control unit for controlling a quantity of the vegetable oil supplied from said reservoir container to said dosing pump via said first feed line.

13. The apparatus of claim 12, wherein said internal combustion engine has an oil pan, further comprising an exhausted vegetable lubrication oil supply line for supplying a quantity of exhausted vegetable lubrication oil from said oil pan of said internal combustion engine to said second feed line.

14. The apparatus of claim 13, wherein said control unit is operable to control the quantity of the vegetable oil supplied from said reservoir container to said dosing pump based on the quantity of exhausted vegetable lubrication oil supplied from said oil pan to said second feed line.

* * * * *